UNITED STATES PATENT OFFICE.

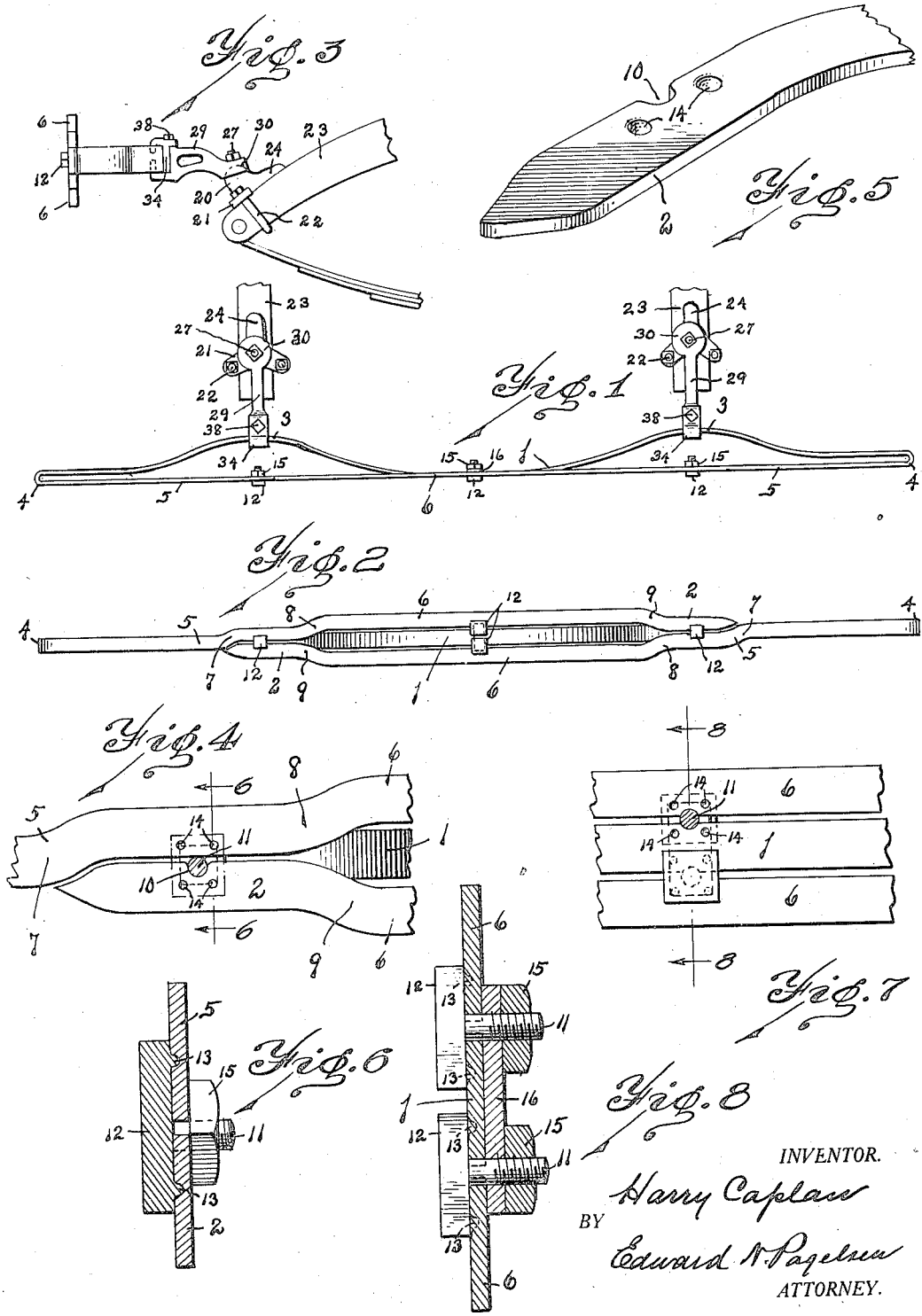

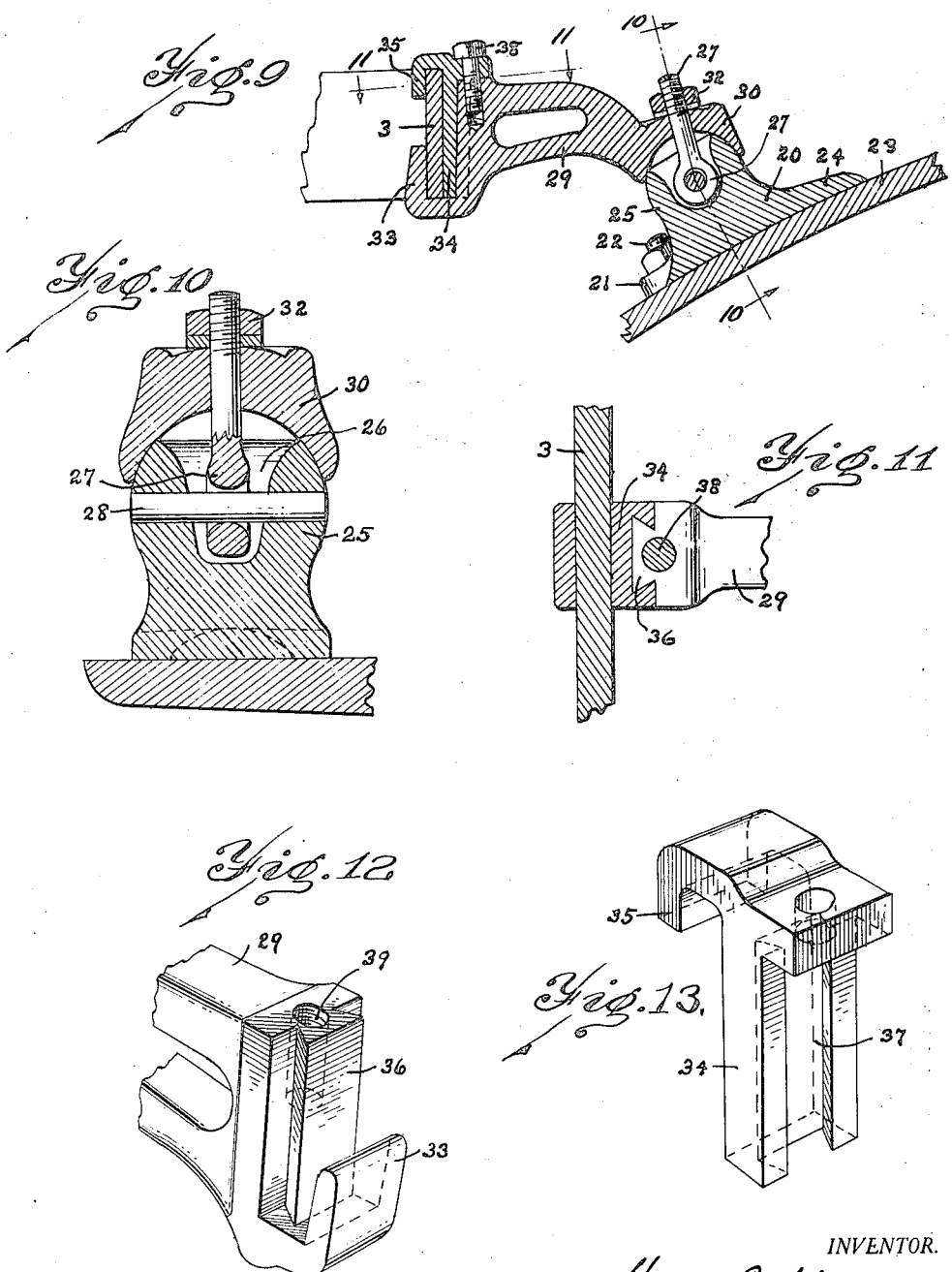

HARRY CAPLAN, OF DETROIT, MICHIGAN.

VEHICLE FENDER.

1,423,186. Specification of Letters Patent. Patented July 18, 1922.

Application filed October 22, 1921. Serial No. 509,643.

*To all whom it may concern:*

Be it known that I, HARRY CAPLAN, a citizen of the Dominion of Canada, and residing at Detroit, in the county of Wayne and State of Michigan, have invented a new and Improved Vehicle Fender, of which the following is a specification.

This invention relates to the construction of fenders adapted to be mounted on the front and rear ends of automobiles, and its object is to provide a structure of this character which can be manufactured at low cost, which will combine great strength with great resilience, and which can be quickly and easily adjusted to the ends of the side bars of vehicle frames which differ considerably in their spacing.

This invention is illustrated in the accompanying drawings, wherein Fig. 1 is a plan of this improved fender and the brackets therefor. Fig. 2 is a front elevation thereof. Fig. 3 is an end elevation thereof. Fig. 4 is a front elevation of that part of the fender where one end of the bar constituting the fender joins the main portion thereof. Fig. 5 is a perspective of one end of the fender bar. Fig. 6 is a section on the line 6—6 of Fig. 5. Fig. 7 is a front elevation of the middle portion of the fender. Fig. 8 is a section on the line 8—8 of Fig. 7. Fig. 9 is a vertical longitudinal section of a fender bracket. Figs. 10 and 11 are sections on the lines 10—10 and 11—11 of Fig. 9 respectively. Figs. 12 and 13 are respectively perspectives of the front end of a bracket and of a wedge to secure the fender.

Similar reference characters refer to like parts throughout the several views.

The fender shown in Figs. 1 and 2 is made of a single bar of flat steel, and its middle portion 1 is in the same plane as the overlapping ends 2 of this bar. The middle portion 1 is arched forward relative to the vehicle on which it is mounted from the supported points 3. The bar extends outwardly and forwardly from the supported points 3 to the end folds 4 of the fender and the inwardly extending parts 5 and 6 and the ends 2 are all preferably in the same plane. The parts 5 are offset vertically about one half their width at each of the points 7 and 8 and the ends 2 are similarly offset at 9 so that the structure will be symmetrical when the ends are brought up to the parts 5 between the points 7 and 8, and the middle portion 1 of the bar is brought forward between the parts 6.

In order to unite these several portions of the bar to constitute a fender, a notch 10 is formed in each end 2 to receive the shank 11 of a bolt whose head 12 is formed with small pins 13 to enter the depressions 14 formed in the parts 5 and ends 2 of the bar. When these two bolts are positioned and the nut 15 screwed down, the two parts 2 and 5 are firmly united. At the middle of the fender the parts 6, 1 and 6 are notched, as shown in Fig. 7, to receive the shanks 11 of similar bolts and these bolts again have pins 13 on their heads 12 to enter the depressions 14 in these parts 6, 1 and 6. A plate 16 formed with holes to receive the shanks 11 may be used to stiffen the fender at this point, the several parts being drawn together by means of nuts 15.

This fender is very stiff for its weight, but possesses considerable resilience, the curved sides of the middle portion 1 of the fender and the curved outer parts between the points 3 and the ends giving strength to the structure, constituting metal arches of comparatively small span. The central portion of the fender is three times as wide as the bar from which it is made and the bolts which secure the several parts together are so positioned that they are as effective as welded joints at these points between the parts of the bar.

Brackets to attach this fender to the curved front ends of the side bars of an automobile chassis are shown in Figs. 3 and 9 to 13 inclusive. These brackets are each formed of two parts connected by a ball and socket joint so that the fender may be positioned at any desired angle. The base 20 is formed with ears 21 having holes to receive the U-bolt 22 which extends around the frame member 23, a rearward extension 24 on the base increasing its bearing on the frame.

The base is formed with a ball 25 and a recess 26 to receive the eye-bolt 27 which is mounted on a pin 28 extending across this recess, the eye being large enough to permit the bolt to swing in all directions. The arm 29 has a socket 30 to fit the ball 25 and a hole for the eye-bolt 27 which receives the nut 32 by means of which the arm may be locked in any desired position. The outer end of the arm 29 is formed with a flange 33 to engage the outer face of the part 3 of the fender and a wedge 34 has a flange 35 to engage the same face. The wedge and outer end of the arm are shown formed with interengaging parts to hold them together, a dove-tail rib 36 on the arm and corresponding groove 37 on the wedge being shown. A screw 38 carried by the wedge and engaging in a threaded hole 39 in the arm is adapted to force the wedge into position. This flange and the rib 36 constitute a notch to receive the fender and the wedge.

It will be noticed that no holes are required at the points 3 in the fender to receive bolts to secure the fender to the brackets and that the fender is slidable in the brackets until locked in position by tightening the screws 38. Fenders of a particular size can therefore be mounted on vehicles whose side bars vary quite widely in their spacing. While bars two inches wide and one fourth inch thick will be found to be of proper size for fenders of many vehicles, these sizes may be varied as desired. In fact, the details of construction and the proportions of the parts of this structure may all be changed by those skilled in the art without departing from the spirit of my invention as set forth in the following claims.

I claim:—

1. A fender for vehicles comprising a flat bar having two points of support at equal distances from its ends, the bar extending outwardly from such points of support and then being folded on itself at points equally distant from its ends so that said ends extend edge to edge in the same plane above each other, and means to secure the ends.

2. A fender for vehicles comprising a flat bar having two points of support at equal distances from its ends, the bar extending outwardly from such points of support and then being folded on itself at points equally distant from its ends so that said ends extend in the same plane and overlap, said folded portions being offset vertically in opposite directions to space them apart, their ends being offset lesser distances to bring one edge of each end adjacent an edge of the other folded portion.

3. A fender for vehicles comprising a flat bar having two points of support at equal distances from its ends, the bar extending outwardly from such points of support and then being folded on itself at points equally distant from its ends so that said ends extend in the same plane and overlap, said folded portions each being formed with two vertical offsets near together to space said folded portions apart, the end of each being offset in the opposite direction a lesser distance to bring one edge of said end adjacent an edge of the other folded portion between the offsets thereof.

4. A fender for vehicles comprising a flat bar having two points of support at equal distances from its ends, the bar extending outwardly from such points of support and then being folded on itself at points equally distant from its ends so that said ends extend in the same plane and overlap, said folded portions each being formed with two vertical offsets near together to space said folded portions apart, the end of each being offset in the opposite direction a lesser distance to bring one edge of said end adjacent an edge of the other folded portion between the offsets thereof, and means to unite said ends and the adjacent main folded portions of the bar.

5. A fender for vehicles comprising a flat bar having two points of support at equal distances from its ends, the bar extending outwardly from such points of support and then being folded on itself at points equally distant from its ends so that said ends extend in the same plane and overlap, said folded portions each being formed with two vertical offsets near together to space said folded portions apart, the end of each being offset in the opposite direction a lesser distance to bring one edge of said end adjacent an edge of the other folded portion between the offsets thereof, and bolts to secure said ends and the adjacent main folded portions of the bar together in the same plane.

6. A fender for vehicles comprising a flat bar having two points of support at equal distances from its ends, the bar extending outwardly from such points of support and then being folded on itself at points equally distant from its ends so that said ends extend in the same plane and overlap, said folded portions being offset vertically in opposite directions to space them apart and the central portion of the bar being curved so its middle point is in the same plane as said folded portions.

7. A fender for vehicles comprising a flat bar having two points of support at equal distances from its ends, the bar extending outwardly from such points of support and then being folded on itself at points equally distant from its ends so that said ends extend in the same plane and overlap, said folded portions being offset vertically in opposite directions to space them apart and the central portion of the bar being curved so its middle point is in the same plane as said folded portions, and means to unite said middle point of the bar and said ends to said folded portions.

8. A fender for vehicles comprising a flat bar having two points of support at equal distances from its ends, the bar extending outwardly from such points of support and then being folded on itself at points equally distant from its ends so that said ends extend in the same plane and overlap, said folded portions being offset vertically in opposite directions to space them apart and the central portion of the bar being curved so its middle point is in the same plane as said folded portions, said ends and the middle point of the bar being notched to receive bolt shanks and also formed with depressions and the folded portions of the bar also being formed with depressions adjacent the other depressions, and bolts extending through said notches and having pins extending into said depresssions to secure the several parts of the bar together.

9. In a fender for vehicles, the combination of brackets each embodying a base attached to the vehicle and an arm connected thereto by means of a ball and socket joint, said arm having a notch to receive a fender, a fender consisting of a flat bar mounted in said notches in the brackets at points equal distances from the ends of the bar, and wedges engaging the bar in said notches to secure it in position.

10. In a fender for vehicles, the combination of brackets each embodying a base attached to the vehicle and an arm connected thereto by means of a ball and socket joint, said arm having a notch to receive a fender, a fender consisting of a flat bar mounted in said notches in the brackets at points equal distances from the ends of the bar, and wedges engaging the bar in said notches to secure it in position, the wedges and the bracket ends interengaging by means of dove-tail ribs and grooves.

HARRY CAPLAN.